Figure 1:
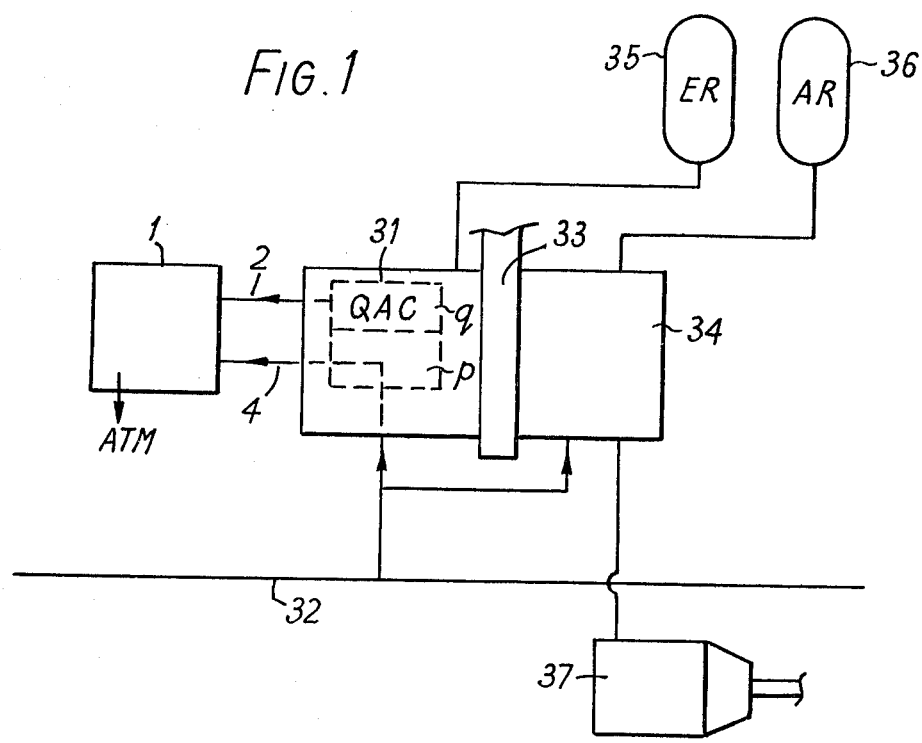

United States Patent [19]

Wickham

[11] 4,070,068
[45] Jan. 24, 1978

[54] VEHICLE BRAKING CONTROL APPARATUS

[75] Inventor: David John Wickham, London, England

[73] Assignee: Westinghouse Brake & Signal Co. Ltd., London, England

[21] Appl. No.: 758,830

[22] Filed: Jan. 12, 1977

[30] Foreign Application Priority Data

Feb. 7, 1976 United Kingdom ............... 04866/76

[51] Int. Cl.² ............................................. B60T 17/04
[52] U.S. Cl. ....................................... 303/82; 303/38; 303/61
[58] Field of Search ................................... 303/35–39, 303/46, 61, 69, 82

[56] References Cited

U.S. PATENT DOCUMENTS

| 1,895,453 | 1/1933 | Down | 303/61 X |
|---|---|---|---|
| 2,032,120 | 2/1936 | Farmer | 303/61 X |
| 2,048,327 | 7/1936 | Farmer | 303/61 X |
| 3,716,276 | 2/1973 | Wilson et al. | 303/82 |

Primary Examiner—Duane A. Reger
Attorney, Agent, or Firm—Larson, Taylor & Hinds

[57] ABSTRACT

A valve arrangement is provided for giving a continuous quick service facility in a triple valve controlling rail vehicle brakes in response to brake pipe pressure reductions. The arrangement comprises a pressure responsive member which responds to more than a predetermined brake pipe pressure reduction in relation to a reference pressure to operate a pulsator which discharges repetitive pulses of air from the brake pipe for as long as the pressure reduction persists.

10 Claims, 3 Drawing Figures

VEHICLE BRAKING CONTROL APPARATUS

This invention relates to vehicle braking control apparatus and relates especially to control apparatus which operates to control the application of fluid pressure to a brake cylinder in response to a reduction of fluid pressure in a brake pipe in relation to the fluid pressure in reference chamber.

In the Specification of U.S. Pat. No. 3,707,314, there is described a fluid operable brake control triple valve apparatus having a brake cylinder port for the supply of fluid pressure into and out of a brake cylinder, the valve being operable by a pressure responsive member movable in response to pressure applied to a brake pipe, a quick service bulb inlet valve via which the brake pipe is connectable to a quick service bulb capacity, a bulb exhaust valve via the quick service bulb capacity is ventable, the bulb inlet and exhaust valves being operable by the member, the bulb inlet valve being opened to effect a discharge of brake pipe pressure into the bulb capacity during movement of the member in response to a reduction of brake pipe pressure to initiate a brake application. This quick service facility does however have a short-coming in that following a brake application and when a partial brake application exists, the quick service bulb capacity is connected directly to the brake pipe and for continuing reductions of brake pipe pressure giving rise to further increases of pressure applied to the brake cylinder, no quick service facility exists.

According to the present invention there is provided valve apparatus for improved quick service operation in a vehicle braking system including a reference pressure signal input port and a brake pipe pressure signal input port, pressure difference sensing means operable following a sensed attainment of a predetermined difference between the pressure signals at said signal input ports to operate pulsating means for discharging repetitive pulses of air from the brake pipe.

In a preferred arrangement, the pulsing means for discharging repetitive pulses of air from the brake pipe is energised for such repetitive pulsing by brake pipe pressure supplied via a valve controlled by the pressure difference sensing means.

The input ports are preferably connected to the quick action chamber and the chamber at brake pipe pressure of an emergency control valve portion associated with a triple valve such as aforementioned to thereby provide continuous quick service operation even following the operation of the triple valve from condition in which a partial brake application exists. Moreover, the predetermined said pressure difference to operate the valve is selected to be a pressure difference which is less than that for which an emergency operation is initiated by the emergency control valve portion.

Figure 2:
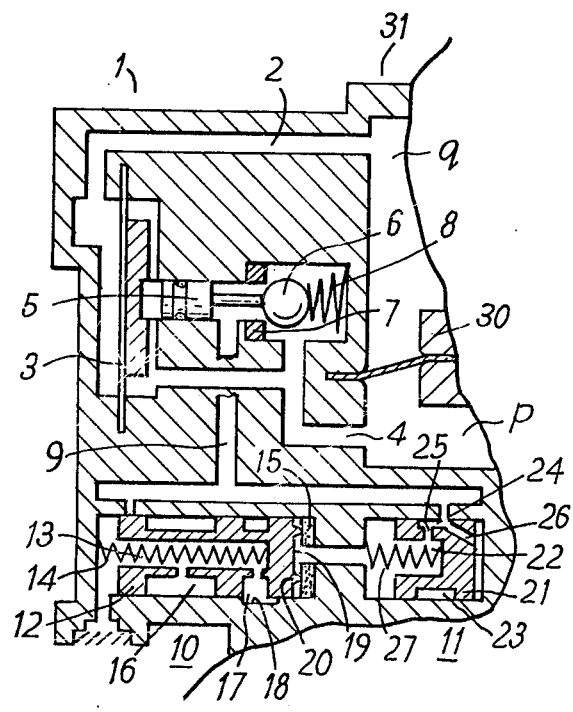
Figure 3:
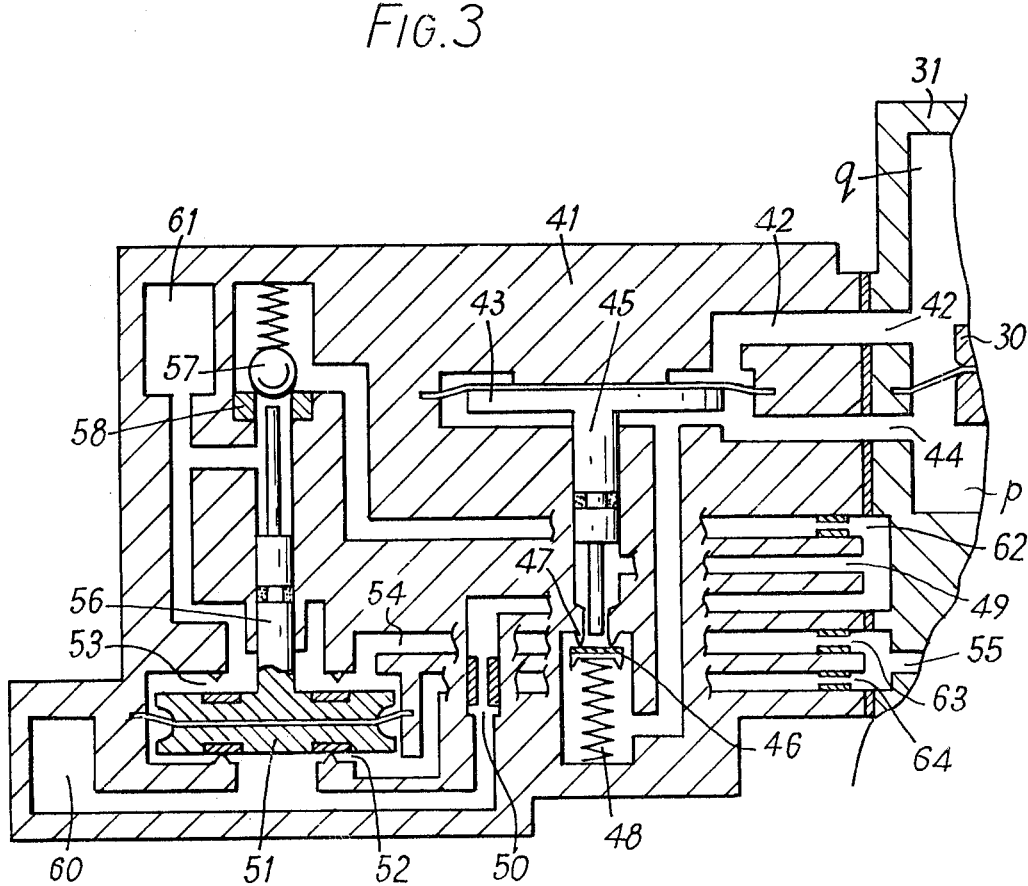

In order that the invention may be more clearly understood and readily carried into effect, the same will be further described by way of example with reference to the accompanying drawings of which, FIG. 1 illustrates in diagrammatical form a brake control valve apparatus to which the present invention is especially intended to be applied, FIG. 2, illustrates a valve apparatus for improved quick service operation in accordance with one embodiment of the invention, and FIG. 3, illustrates an alternative embodiment of the invention.

A typical emergency valve portion for use in conjunction with a triple valve of the general type referred to above with reference to the Specification of U.S. Pat. No. 3,707,314, is described in some detail in the Specification of Copending U.S. patent application Ser. No. 591,320. In its essentials, the apparatus described therein comprises a pressure responsive member separating a chamber at brake pipe pressure from a chamber at a quick action chamber reference pressure. These two chambers are ordinarily maintained at equal pressures and the pressure responsive member is responsive only to at least a predetermined change of brake pipe pressure in a given time to open a brake cylinder valve to provide a communication between a fluid pressure reservoir and a brake cylinder and to open a vent valve which is effective to vent the brake pipe to thereby effect an emergency brake operation. It will be appreciated moreover that the rate of change of brake pipe pressure in relation to the quick action chamber pressure, to effect such an emergency operation, is substantially greater than the rate of change which normally is effected to operate the associated service triple valve to produce a normal service braking operation.

The apparatus 1 in accordance with the present invention, is therefore assumed to be mounted alongside an emergency portion of fluid operable brake control valve apparatus such as described in the aforementioned Specification, and as illustrated in diagrammatical form at 31, 33, 34 in FIG. 1. the reference pressure signal input port 2 is connected to receive a signal $q$ from the quick action chamber (QAC) of the emergency portion 31 and the brake pipe pressure signal input port 4 being connected to receive a signal $p$ from the brake pipe 32.

The pipe bracket upon which the emergency portion is mounted is represented by reference 33 and this also carries a triple valve 34 as the service portion of the control valve apparatus. Emergency and auxiliary reservoirs 35 and 36 are shown connected to the emergency and service portions and the output of the service portion, which in the event of an emergency valve operation is also supplemented by emergency reservoir air, is applied to a brake cylinder represented by reference 37. It will be appreciated from the said Specification that for a normal service application, the emergency portion provides a path via which the quick action chamber pressure is enabled to follow reductions of brake pipe pressure. Only when the brake pipe pressure falls at more than a prescribed rate is the emergency portion operated to effect rapid venting of the brake pipe and connection of the emergency reservoir to the brake cylinders to supplement a full service application.

Referring now to FIG. 2, this merely shows improved quick service apparatus in accordance with the first example of the invention and this is shown as it may be connected to the emergency portion 31 such as referred to above. For this purpose, the pressure responsive member of the emergency portion is represented by the reference 30, the pressure $q$, being in the chamber at quick action chamber pressure and the pressure $p$ being the chamber at brake pipe pressure. The reference pressure input port is a passage 2 which communicates with one side of a pressure responsive member 3 of a pressure difference sensing means, the other side of which is connected to a passage 4 forming the brake pipe pressure signal input port. The input ports 2 and 4 are connected as shown to the aforementioned chambers of the emergency control valve portion as indicated to receive pressures $q$ and $p$ respectively. The pressure difference sensing means is coupled via a sealingly slideable stem member 5 having a short push rod for unseating a valve member 6 from a resilient valve seat 7 in opposition to a spring 8 which normally holds the member 6 against its seat. One side of the member 6 is connected to the port 4 and on unseating of the valve 6, the port 4 is connected to a passage 9 one path from which passes to a means 10 for discharging pulses of air from the input port 4 to atmosphere and another path from 9 is connected to provide a source of energy for operating the pulsating means 10.

Referring to the pulsating means 10, this comprises a piston member 12 having a central bore 13 retaining a captive spring 14 by virtue of which the member 12 is biased towards a valve seat 15 at the right hand end of a cylinder within which the member 12 is readily slideable. The member 12 is provided moreover with two annular regions 16 and 17 each communicating with the bore 13 and the cylinder is provided with a cut-out region 18 which is normally covered by the closed end of the member 12. The closed end 19 of the member 12 is provided with an annular valving upstand 20 which engages the seat 15 and an aperture in the centre of the seat 15 provides communication from the arrangement denoted generally by the reference 11 which is for supplying energy to the pulsing means.

Though not essential to the invention, the means 11 comprises a device for achieving approximately constant timing of the pulsations of the means 10 and consists of a slideable cylindrical member 21 which is biassed by a spring 22 as shown towards the right hand end of a cylinder 23 within which 21 is slideable. An annular region 24 of 21 is connected via small passages 25 and 26 to the right hand end of cylinder 23 and the left hand end of cylinder 23. The annular region 24 is so positioned that on deflection of the cylindrical member 21 against the thrust of the spring 27, the input path communicating therewith from the passage 9 is partially closed. By this means and the suitable selecting of the sizes of the passages and the rating of the spring 27, a substantially constant time of charging of the region to the left of the piston 21 in the cylinder 23 may be achieved over a wide range of brake pipe pressures as presented in the passage 9 owing to the metering effect of the path thereto by the said partial closure by cylinder 21 as a result of build-up of pressure to the right of the piston 21.

Referring now to the operation of the improved quick service arrangement, on a reduction of brake pipe pressure for the purposes of initiating a service braking application by operation of the service triple valve, the reduction of brake pipe pressure $p$ in relation to the quick action chamber pressure $q$, may not be sufficient to deflect the pressure responsive member 1 to cause an emergency operation, but nevertheless the setting of the pressure difference responsive means 3 in conjunction with the spring 8 is such as to cause the valve 6 to unseat at a pressure difference value which is, for example, somewhat less than 0.5 p.s.i. The opening of the valve 6 immediately opens a communication between the port 4 and the passage 9 and a very small amount of air sufficient to operate the pulsating means 10, is metered by the means 11 into the region to the right of the piston 12 of 10. When the pressure therein attains a value which applied over the area circumscribed by the upstand 20 is sufficient to deflect the spring 14, the piston 12 unseats and the pressure is immediately applied over the whole area of 12 to cause rapid movement of the member 12 to the left. On reaching the cut-out 18, the accumulated air to the right of piston 12 is discharged into the annular region 17 and thence through to the centre of 12 and out to exhaust, whereupon the member 12 returns rapidly to the position shown. The annular region 16 shown in the member 12 forms a small bulb capacity and during the short interval of time while the member 12 is deflected to the left, a path is provided from the passage 9 to this annular region 16. This region then discharges to atmosphere. The means 10 therefore operates to discharge pulses of brake pipe air from 9 to atmosphere. It will be understood moreover that the pulses from 9 are such as to be relatively short in relation to the interval periods during which the region to the right hand side of the piston 12 is recharging via the means 11.

While a device 11 is shown in the drawing which over a wide range of brake pipe pressures tends to produce constant frequency pulses of air from the brake pipe and via passage 9, a device may alternatively or additionally be fitted to tend to afford equal quick service bulb effects regardless of brake pipe pressure as compared with the device 11 which gives constant cycling times.

The effect of the arrangement is that for all appreciable changes to brake pipe pressure such as are intended to initiate a service braking operation by the service triple valve, while not necessarily operating the emergency portion, there will be provided a quick service facility by virtue of the pulsed discharging of brake pipe pressure which occurs while a sufficient pressure differential exists between the input ports 2 and 4. It is worthy of brief note moreover that during recovery of brake pipe pressure for the purposes of brake releasing, the sense of operation of the pressure responsive means 3 is such as to hold the valve 6 securely closed and therefore the apparatus, as shown, has no effect during a brake releasing operation of triple valve or the emergency portion.

Referring to FIG. 3, this illustrates as aforementioned, an alternative form of valve apparatus for performing continuous quick service operation in an arrangement such as that of FIG. 1. The main body 41 of the valve apparatus is again mounted alongside the emergency portion of brake control apparatus which is also as described with reference to the aforementioned Specification. The quick action chamber pressure is again denoted as $q$ and the brake pipe pressure is again indicated as $p$, passages 42 and 44 respectively being provided connecting pressures $q$ and $p$ respectively to opposite sides of the pressure responsive member 43 which has a stem 45 with a push-rod engageable with a spring-loaded valve member 46 which normally seats on a valve seat 47. The passage 44 also communicates with a region 48 beneath the vave member 46. The region beneath the sealingly slideable stem 45 and valve 46 is connected via a passage 49 and a restriction 50 to the underside of a pressure responsive member 51 which is normally seated as shown on an annular valve seat 52 so that the area presented by the member 15 in this position, is the area of the annular seat 52. The pressure responsive member 51 is a diaphragm piston of greater area than the annular seat 52 and the region 53 above the member 51 is connected via a passage 54 to atmosphere at a port 55. The port 55 is also connected to the region surrounding the annular valve seat 52. The pressure responsive member 51 further carries a sealingly slideable stem 56 which on rising from the shown position is engageable with a spring-loaded ball valve member 57 normally seated on a seat 58. Suitably selected volumes 60 and 61 are provided connected to the regions respectively underneath and above the pressure responsive member 51 to provide the requisite capacities to cause the pressure responsive member 51 to pulsate with desired cycling times.

In operation of the arrangement of FIG. 3, on a reduction of brake pipe pressure for the purposes of initiating a service brake application by operation of the service triple value, the reduction of brake pipe pressure at $p$ in relation to quick action chamber pressure at $q$ may be sufficient to deflect the pressure responsive member of the emergency portion to one of the emergency portion to initiate an emergency operation. Nevertheless, the setting of the pressure difference responsive means, namely the pressure responsive member 45 in conjunction with the spring in the chamber 48 is such as to cause the valve 46 to unseat at a pressure difference value, to quote the same value as previously, is somewhat less than 0.5 p.s.i. The opening of valve 46 immediately opens a communication between the passage 44 and the passage 49 to enable the commencement of a build-up of air pressure in the capacity 60, the pressure in which acts on the central circular area of the member 51, namely that contained by the annular seat 52. When the pressure attains a value which is sufficient to deflect the pressure responsive member 51 in an output direction, the pressure in the volume 60 then acts over the full area of the member 51 causing a snap action to occur wherein the member 51 rises rapidly to seat against the annular seat 53 thereby sealing off the atmospheric passage 54 from the chamber 61 and also unseating the valve 57. This unseating of valve 57 connects the upper central region of the pressure responsive member 51, bounded by the area of annular valve seat 53, together with the volume 61 via the unseated valve 57, the passage 49 and the unseated valve 46, via the passage 44 to the brake pipe pressure region $p$ beneath the pressure responsive member 1. While this condition pertains the brake pipe is thus permitted to discharge a quantity of air into the volume 61 and the parts connected thereto until the pressure over the area enclosed by the annular seat 53 is sufficient to overcome the pressure beneath the pressure responsive member 51, which is reducing via the atmospheric port 55. When this occurs, the pressure responsive member 51 exerts a reverse snap action and the process repeats continuously so long as the pressure responsive member 42 remains downwardly deflected by the predominence of quick action chamber over brake pipe pressure. This continuously repetitive action therefore causes repetitive pulsing of brake pipe pressure into the volume 61 with intermittent discharging of 61 to atmosphere. Appropriate chokes 62, 63 and 64 operate in conjunction with the volume 60 and 61 to achieve the desired pulsing characteristics of the pressure responsive member 51. The choke 62, for example, operates in conjunction with the volume 61 to determine the rate at which the pressure in the volume 61 increases towards the point of which the pressure responsive member 51 returns downwards and the choke 64 determines the rate at which the volume 60 at the same time discharges to atmosphere, choke 63 providing a similar impedance in the passage 54 to atmosphere.

I claim:

1. In fluid pressure controlled apparatus for a vehicle braking system controlled by pressures in a brake pipe, valve apparatus for improved continuous quick service operation, comprising a reference pressure signal input port and a brake pipe pressure signal input port, pressure difference sensing means for continuously sensing and responding to pressure differences between the pressure signals at said signal input ports, pulsating means operative when energized to discharge repetitive pulses of air from the brake pipe, and means responsive to sensed attainment of a predetermined pressure difference by said sensing means to effect energization of said pulsating means so long as said sensed predetermined difference continues.

2. Valve apparatus as claimed in claim 1 wherein said pulsating means comprises a pressure responsive means which in one position presents a first smaller area to a chargeable volume and when deflected from that position by pressure accumulated in said volume, presents a second larger such area and a discharge path for said volume.

3. Valve apparatus as claimed in claim 2, wherein said pressure responsive means is spring biassed towards the one position.

4. Valve apparatus as claimed in claim 2 wherein said pressure responsive means is reciprocable between said one position and a second position in which it presents a third smaller area to pressure accumulated in a further chargeable volume and when deflected from that position, presents a fourth larger such area and a discharge path for said further volume.

5. Valve apparatus as claimed in claim 4, wherein the first said area is subject to air pressure supplied via a restriction and the third said area is subject to brake pipe air supplied via a restriction and a further valve controlled by the pressure responsive means to accept restricted pulses of brake pipe air into the further volume.

6. Railway vehicle emergency braking control valve apparatus for operating in conjunction with a service triple valve and being provided with a continuous quick service valve apparatus as claimed in claim 1.

7. Apparatus as claimed in claim 1 wherein said pulsating means is energized by brake pipe pressure, and wherein said means for effecting energization comprises a valve controlled by said pressure difference sensing means for supplying brake pipe pressure to said pulsating means.

8. Apparatus as claimed in claim 7 wherein the brake pipe air which energizes said pulsating means is discharged from the pulsating means in repetitive pulses.

9. Apparatus as claimed in claim 1 wherein the vehicle braking system includes an emergency valve portion having a quick action chamber, a chamber at brake pipe pressure, and a pressure responsive member for initiating emergency braking operation in response to a predetermined pressure difference between pressures in said chambers, and wherein said reference pressure signal input port is connected to the quick action chamber, and wherein the predetermined pressure difference to effect energization of said pulsating means is less than the pressure difference which initiates an emergency braking operation.

10. Apparatus as claimed in claim 1 wherein said pulsating means is energized by fluid pressure, and wherein said means for effecting energization comprises a valve controlled by said pressure difference sensing means for supplying fluid pressure to said pulsating means during attainment of said predetermined pressure difference.

* * * * *